(12) United States Patent
Chung et al.

(10) Patent No.: US 7,264,837 B2
(45) Date of Patent: Sep. 4, 2007

(54) RESIN DEACIDIFICATION OF CITRUS JUICE AND HIGH ACID MAINTENANCE

(75) Inventors: Yongsoo Chung, Bradenton, FL (US); Osvaldo A. Chu, Sarasota, FL (US); Marcelo Perez Alvarez, Bradenton, FL (US)

(73) Assignee: Tropicana Products, Inc., Bradenton, FL (US)

( * ) Notice: Subject to any disclaimer, the term of this patent is extended or adjusted under 35 U.S.C. 154(b) by 521 days.

(21) Appl. No.: 10/405,553

(22) Filed: Apr. 2, 2003

(65) Prior Publication Data

US 2004/0197448 A1    Oct. 7, 2004

(51) Int. Cl.
*A23L 2/02*    (2006.01)

(52) U.S. Cl. ............. 426/330.5; 429/599; 429/271; 429/422; 210/660; 210/662; 210/672

(58) Field of Classification Search ............ None
See application file for complete search history.

(56) References Cited

U.S. PATENT DOCUMENTS

| | | |
|---|---|---|
| 3,939,071 A | 2/1976 | Katzakian, Jr. et al. |
| 4,083,782 A | 4/1978 | Kunin |
| 4,297,220 A | 10/1981 | Meitzner et al. |
| 4,439,458 A | 3/1984 | Puri |
| 4,514,427 A | 4/1985 | Mitchell et al. |
| 4,522,836 A | 6/1985 | Dechow et al. |
| 4,666,721 A | 5/1987 | Norman et al. |
| 4,839,086 A | 6/1989 | Zaid |
| 4,965,083 A | 10/1990 | Norman et al. |
| 5,106,638 A | 4/1992 | Siegers |
| 5,474,704 A | 12/1995 | Zaid |
| 5,734,046 A | 3/1998 | Ifuku et al. |
| 5,817,354 A | 10/1998 | Mozaffar et al. |
| 5,863,438 A | 1/1999 | Katzakian, Jr. et al. |
| 5,885,638 A | 3/1999 | Takayanagi et al. |
| 6,045,842 A | 4/2000 | Mozaffar et al. |
| 6,534,107 B1 | 3/2003 | Ma et al. |
| 6,730,343 B2 * | 5/2004 | Chung et al. ............ 426/271 |
| 7,074,448 B2 * | 7/2006 | Lineback et al. ......... 426/330.5 |
| 2003/0064144 A1 | 4/2003 | Chu et al. |
| 2004/0161505 A1 * | 8/2004 | Chung et al. ............ 426/271 |

FOREIGN PATENT DOCUMENTS

| | | |
|---|---|---|
| BG | 751 252 | 6/1956 |
| EP | 0 206 239 | 12/1986 |
| EP | 0 334 641 | 9/1989 |
| GB | 1 572 607 | 7/1980 |
| WO | WO 01/87092 | 11/2001 |

OTHER PUBLICATIONS

Khym, J. X. 1974. Analytical Ion-Exchange Procedures in Chemistry and Biology. Prentice-Hall, Inc., NEnglewood Cliffs, NJ. p. 1-23, 127-131.*

Johnson and Chandler, "Ion Exchange and Adsorbent Resins for Removal of Acids and Bitter Principles from Citrus Juices", J Sci Food Agric 1985 36: 480-484.
Johnson and Chandler, "Adsorptive Removel of Bitter Principles and Titratable Acid from Citrus Juices", Food Technology; May 1988, p. 130-137.
Kimball and Norman, "Processing Effects during Commercial Debittering of California Navel Orange Juice", J Agric Food Chem 1990 36:1396-1440.
Manlan, et al., "Evaluation of the Properties of Polystyrene Divinylbenzen Adsorbents for Debittering Grapefruit Juice", Journal of Food Science, vol. 55, No. 2, 1990, p. 440-445.
Norman and Kimball, "A Commerical Citrus Debittering System", ASME 36: pp. 1-31, 1990.
Wethern, "Citrus Debittering With Ultra Filtration/Adsorption Combined Technology", ASME 37: 44-66, 1991.
Milnes and Agmon, "Debittering and Upgrading Citrus Juice and By-Products Using Combine Technology", University of Florida, Sep. 27-29, 1995.
Milnes and Agmon, "Debittering and Upgrading Citrus Juice and By-Products Using Combined Technology", University of Florida, Sep. 27-29, 1995.
MacGregor and Schofield, "Alimentech Debittering (and Allied) Processes", University of Florida, Sep. 17-19, 1991.
Wethern, "Citrus Debittering With Ultrafiltration/Adsorption Combined Technology", Florida Section; Mar. 21, 1991, vol. XXXVII.
Norman and Kimball, "A Commerical Citrus Debittering System", Florida Section; Mar. 29, 1990, vol. XXXVI.
Norman, "Production and Packaging of Non-Carbonated Fruit Juices and Fruit Beverages", Blackie and Son, Ltd.; 1990, p. 243-263.
Nagy, et al. "Fruit Juice Processing Technology", AGSCIENCE, Inc.; 1993 Auburndale Florida p. 192-214.
Berhow et al., "Citrus Limonoids", ACS Symposium Series, 2000.
LaFlamme and Weinand, "New Developments by the Combination of Membrane Filtration and Adsorption Technology", Fruit Processing, Sep. 1993. p. 336-342.

* cited by examiner

*Primary Examiner*—Carolyn Paden
(74) *Attorney, Agent, or Firm*—Banner & Witcoff, Ltd.

(57) ABSTRACT

The deacidification of citrus juice with ion exchange resin is described. Maintaining a high acid condition of the juice is achieved by passing the juice through regenerated resin that is preconditioned with an aqueous food-grade acid, preferably citric acid. Additionally or optionally, an early bed volume or multiple early bed volumes of juice flow are at a rapid flow rate. The products obtained also are described, and they may be any deacidified citrus juice or juice blend where the pH of the juice does not rise above that of an acid food pH for the juice during deacidification. In preferred embodiments, the juice product is orange juice. In another preferred embodiment, the conditioning process is used to provide a deacidified citrus juice product while avoiding raising the pH of any portion of the juice to 4.6 or above so as to control microbial growth of the juice.

30 Claims, 3 Drawing Sheets

RESIN DEACIDIFICATION OF CITRUS JUICE AND HIGH ACID MAINTENANCE

BACKGROUND OF THE INVENTION

This invention generally relates to resin deacidification of a juice while maintaining its high acid condition. The preferred embodiment relates to conditioning of ion exchange resins and the product obtained by use of conditioned resins. More specifically, the preferred embodiment relates to the use of acid to condition regenerated resin used in the deacidification of citrus juice. Conditioning regenerated resin allows for deacidified citrus juice with a lower maximum pH and less risk of microbial growth than citrus juice deacidified with unconditioned resin.

FIELD OF INVENTION

As awareness of the nutritional benefits of consuming citrus fruits has increased, so has the demand for such products. Citrus is an extremely valuable source of nutrition, and has been recognized to aid in the treatment and prevention of disease. Consequently, it is widely believed that the regular consumption of citrus is a beneficial, if not essential, part of maintaining one's health.

Despite widespread knowledge regarding the benefits of citrus, it may be avoided by some due to its relatively high acid content. Acidity may contribute to a number of negative experiences upon ingestion of citrus. These experiences may include gastral distress and/or digestive difficulties. It is therefore desirable to obtain reduced acid citrus juices.

Numerous individuals have been known to experience negative effects upon ingesting different foods. A true food allergy occurs when the immune system of the individual overreacts to certain proteins in food. It is believed that hundreds of food ingredients can provoke an allergic reaction. Typical foods in this regard are nuts, peanuts, milk, eggs, fish, shellfish, soybeans and wheat. Foods such as these can lead to symptoms including nausea, hives, skin rash, nasal congestion, wheezing, and the like. However, most unpleasant reactions to food are caused not by allergies but by intolerances, which tend to be less severe than true food allergies. Typical in this regard are lactose intolerance, sulfite intolerance and intolerance to monosodium glutamate, red wine, chocolate and food coloring agents. Another intolerance of some frequency is manifested by gastral distress and/or digestive difficulties which certain individuals experience shortly after ingesting orange juice products.

In some circles, it is generally assumed that the relatively high acidity of orange juice products is a primary contributor to these negative or unpleasant experiences with orange juice products for a small percentage of the population. For example, Kligerman et al U.S. Pat. Nos. 5,665,415 and 5,869,119, incorporated hereinto by reference, suggest that acidic foods or beverages such as coffee and other beverages can be combined with calcium glycerophosphate so as to raise the pH of the food or beverage by at least 0.5 pH units, such as to a pH of greater than 5.4, which typically is pH higher than desirable for superior tasting orange juice. This pH adjustment is said to reduce the tendency of the food or beverage to cause heartburn and other esophageal and/or gastrointestinal distress. This approach generally follows the conventional wisdom that ingesting antacids treats heartburn by helping to neutralize stomach acid. This approach suggests, in general, raising the pH of the food or beverage to well above 5.

Various past endeavors have sought ways to remove acid from citrus. Techniques such as filtration and ion exchange technology have been employed to remove acid from citrus juices such as orange juice. Recent years have proven ion exchange technology highly useful in this process. Ion exchange technology use in the citrus industry is a beneficial way to reduce acid, and thereby increase the demand for citrus juice.

Processes for deacidifying citrus juice have been known since the 1960s, and commercially-viable deacidification processes using anionic ion exchange for acid reduction of citrus fruit juices were known by 1980. However, such processing was used for deacidifying juice made from concentrate, which has a standard of identity (SOI) that permits a great range of flexibility in the processing steps with respect to the dilution and blending of the juice product.

Since that time, "not from concentrate" or NFC juices have become very popular with consumers because of their "fresh-squeezed" taste. These NFC juices must meet their own SOI criteria. Among these criteria is the avoidance of a final juice product which has water added characteristics. Other criteria typically include brix minimums and brix-to-acid ratio minimums.

For example, the US Food and Drug Administration sets a standard for juices such as orange juice, including brix minimums. In this regard 21 CFR Section 146.140, incorporated by reference hereinto, states that finished pasteurized orange juice is to contain not less than 10.5 percent by weight of orange juice soluble solids, exclusive of the solids of any added sweetening ingredients. This FDA regulation further states that the ratio of brix to grams of citric acid per 100 ml of juice is not less than a 10 to 1 ratio. The juice industry recognizes these criteria for pasteurized orange juice or single strength orange juice as applying to NFC orange juice. It will be understood that these SOI criteria are used herein with respect to NFC orange juice or pasteurized single strength orange juice. This same concept of SOI criteria applies as well to other pasteurized single strength juices.

In the citrus industry, ion exchange technology often involves interactions between the juice and a resin. Resins are a special class of polyelectrolytes that are insoluble and can exchange ions with a liquid without any permanent change to their structure. A resin may be charged to attract any of strong or weak acids or bases, depending on its desired use. Further, a resin may actually exchange ions, or may adsorb the ions of the liquid without releasing any ions of its own.

During the ion exchange process, the resins exchange or adsorb the ions of the liquid to change the chemical composition of the liquid. The affinity of a resin for the ions of the liquid may depend on several factors. These factors include the degree of cross-linking, the valence and size of the ions, and the polarity of the composition.

In the deacidification of citrus juice, weak base anion resins are preferred, as they are best able to attract acid ions of the juice. The citrus juice stream then is allowed to contact the resin. When contact is made between the juice stream and the resin, ion "exchange" takes place.

Often, a resin used in deacidification adsorbs ions of the juice stream, rather than exchanges the ions. This resin entraps the abundant acid ions of the juice stream within its structure. As the ions of the citrus juice are removed by the resin, the pH of the juice rises. In general, the affinity of the resin for acid decreases throughout the deacidification process as available sites become filled.

In exchange techniques are particularly favored in juice deacidification because the process is reversible. The resin is regenerated and used again. In deacidification, a resin used to remove acid from products may be regenerated by contacting the resin with a composition. The composition removes the adsorbed acid ions from the resin, thereby freeing sites for further ions to be adsorbed. The resin may then again be used to remove acid moieties from citrus juice.

Non-deacidified citrus juices do not have to be concerned with an issue which can be raised by certain deacidified citrus juice products. The low pH of acid foods does not favor the growth of certain pathogenic microorganisms such as Clostridium botulinum. Since these microorganisms are more likely to grow at a pH at or above 4.6, low acid or deacidified foods may require a more aggressive heat treatment to prevent microbial growth and spoilage.

Non-deacidified citrus juices including orange juice and grapefruit juice traditionally are categorized as acid food, which require a less severe heat treatment (pasteurization) to prevent microbial growth as required under applicable industry standards. Technically, to meet the requirement of acid food, the pH of the deacidified juice should be less than 4.6 during processing. If the pH is at or greater than about 4.6, an aggressive treatment to prevent microbial growth may be necessary.

This invention recognizes the disadvantage of using an ion exchange process in citrus juice deacidification. Traditionally, the affinity for acidic ions of fresh resin and immediately following resin regeneration and for some time thereafter can give cause for concern. This heightened affinity results in having the resin adsorb acidic ions so as to lead to an increase in pH of the juice itself. If the pH of a juice rises to or above about 4.6, microbial growth in the juice begins to become a concern.

Addressing this concern is a need recognized and answered by the present invention. Also in need of a composition is how to provide a citrus juice product having a controlled reduced acidity which is achieved by effective ion exchange resin techniques and which has no microbial growth due to transitory high pH conditions during such ion exchange processing.

SUMMARY OF THE PRESENT INVENTION

Figure 1:
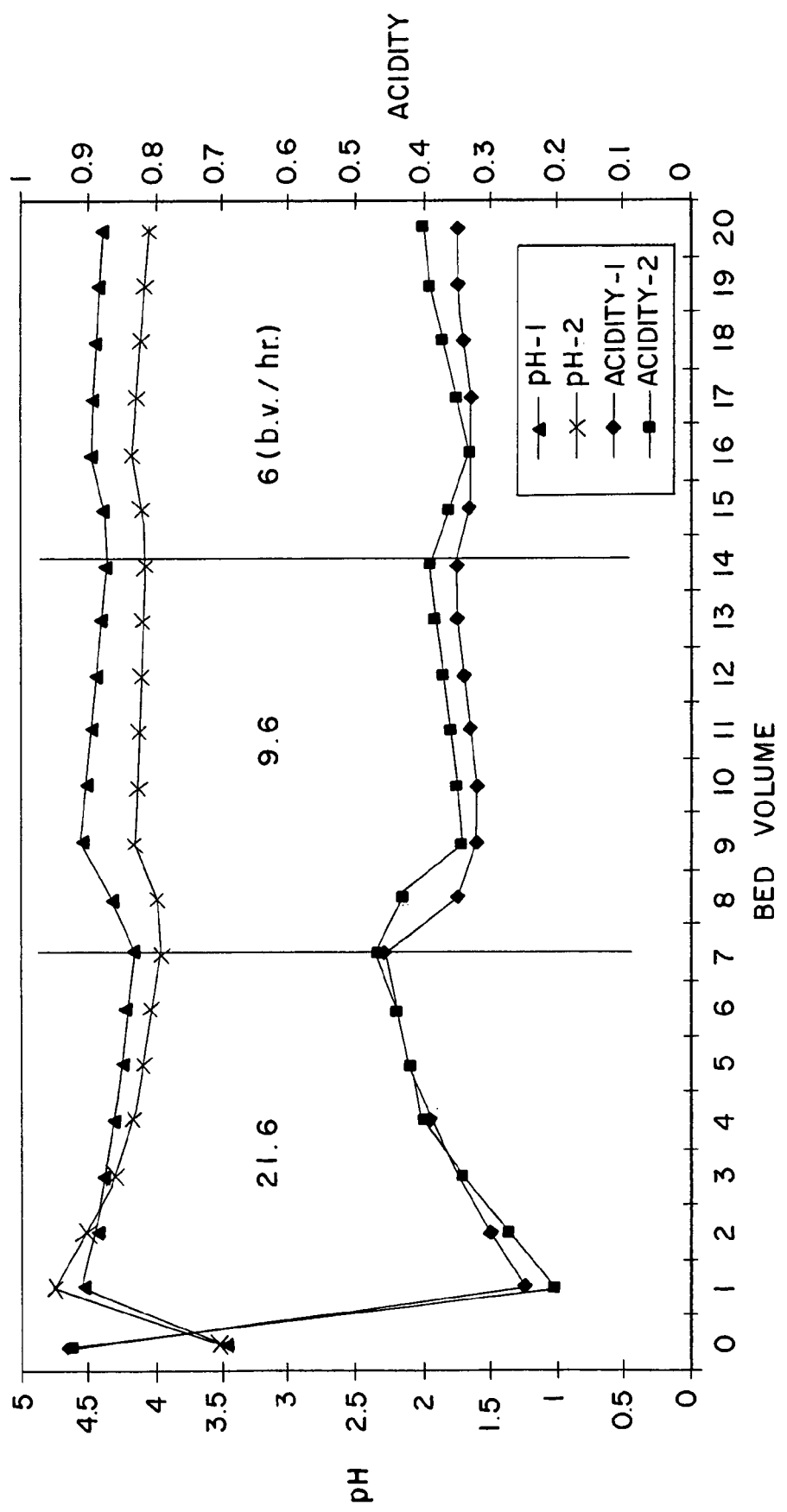
FIG. 1 is a plot of pH readings and of acidity readings for regenerated and preconditioned resin through a plurality of bed volume runs.

The present invention in at least one embodiment meets needs noted above by conditioning the fully regenerated ion exchange resin prior to its re-use for deacidifying the flow of citrus juice by contacting the regenerated resin with an acidic composition. Citrus juice contacts the thus-conditioned resin and is collected as a reduced acid citrus juice source. It has been found that such conditioning avoids the risk of unacceptable microbial growth. A deacidified product is thereby produced. In another aspect, juice flow rate through the resin is varied in order to address such problems.

DETAILED DESCRIPTION OF THE INVENTION

Deacidification of citrus juice may take place in any number of known devices. For example, the form of ion exchange resin equipment used in deacidification of citrus juice may be a flow-through column and/or a continuous system or semi-continuous system. Another possibility is the use of resins in a bed formation, such as in an overall batch approach. Ion exchange technology may be utilized to deacidify citrus juice in any number of possible devices, provided that the resins are allowed to contact the citrus juice during the process.

The resins used in ion exchange technology may likewise be of a wide variety. Resins of any level of binding affinity may be used, depending on the acidity of the citrus juice. In one preferred embodiment, the resin used is a weakly-basic, anionic exchange resin, often a polystyrene copolymer which contains a tertiary amine group as a functional group. This weakly-basic resin is preferred because of its ability to pull organic acid from the citrus juice, thereby producing a deacidified citrus juice stream.

Examples of other commercial resin systems include those incorporating ion exchange resins such as anionic polystyrene copolymers which release chloride groups and basic anionic polystyrene resins having quaternary ammonium active groups. Specifically, resins such as Dowex® 77, Duolite® A7 and Diaion® WA 30 may be used. It is presently believed that beaded or monospheric resin types are especially suitable for use in connection with the invention.

For example, the Duolite® A7 resin system, has a phenol-formaldehyde polycondensate matrix with a secondary amine functional group and a non-uniform shape. After this is preconditioned with citric acid, its pH control range is 4.8 to 3.6, and its capacity is 44% acid removed at a 20 column volume capacity.

A further example, the Dowex® 77 resin system, has a styrene/divinylbenzene matrix with a tertiary amine functional group and a uniform, monosphere shape. After this resin is preconditioned with citric acid, its pH control range is 4.5 to 4.1, and it capacity is 62% acid removed at a 20 column volume capacity. In general the Dowex resin systems, when compared with other resin systems, can be especially suitable because they have a comparatively low percentage of strong ionic sites, typically between about 10 and 15 percent. Low levels of strong ionic sites have been found to minimize the number of bed volumes of resin which need to be treated according to the invention for a given concentration of preconditioning acid and for a given flow rate.

Other, non-monosphere resins include those having a gelular acrylic matrix, such as the Amberlite® IRA-68 resin system, which has a gelular acrylic matrix with a tertiary amine functional group. It has a non-uniform gel type shape. Its pH control range is 9.6 to 3.5, and its capacity is 65% acid removed at a 20 column volume composite juice sample.

Deacidification of citrus juice takes place as a juice stream is passed through or otherwise contacts the resin bed. The juice used may be any citrus juice, including orange and grapefruit, the preferred juice being orange juice. The juice may be single-strength juice, including not-from-concentrate (NFC) juice. To deacidify the citrus juice using ion exchange technology, a juice stream comes in contact with the ion exchange resin. The preferred method uses a juice stream that is passed through the resin structure, such as the resin bed or column. As the juice contacts the resin, ion exchange takes place in accordance with known principles.

In ion exchange deacidification, when the citrus juice stream comes in contact with the resin, ions of the juice are exchanged with those of the resin. In the preferred embodiment, the acidic citrus juice comes in contact with, and is attracted to, the weakly-basic polystyrene resin. The ion exchange resin adsorbs the citrate ions of the citrus juice. Adsorption is the accumulation of ions on a resin pore surface, resulting in a relatively high concentration of the ions at the surface of the resin. After acid ions including citrate ions of the juice stream are adsorbed by the resin, the stream is substantially less acidic.

Although deacidification removes acid ions from the juice stream, deacidified juice products are not acid-free. While contact with the resin may remove most acid ions from the juice stream, some still remain. The presence of some of these ions in the juice stream is desired for taste.

In the deacidification process, the resins adsorb acidic ions until they can hold no more. When ion exchange resins have used all possible sites to adsorb ions, the resins are "spent." One possible indicator of spent resins is the increasing acidity of the juice stream following contact with the resins. The acidity of the juice stream exiting the resin column increases up to the initial food acidity. Generally correspondingly, the pH of the stream decreases, indicating that the adsorption capacity of the ion exchange resins has been greatly reduced and the resins must be regenerated.

In the regeneration of ion exchange resins, the ions adsorbed by the resin must be removed by a strong aqueous composition of the opposite charge of the ions being removed. In the preferred embodiment, the acidic ions are removed from the resins with a strong base such as sodium hydroxide. As the basic composition contacts the resin, the adsorbed ions are pulled off of the resin and into the composition. The ions then are carried away as the composition ends contact with the resin. If desired, regeneration may be followed with a water wash, or multiple washes, to remove excess regenerative composition. The resin is left with no adsorbed ions, and the resin exhibits an increased binding affinity for the acidic ions of the citrus juice.

Following regeneration, the ion exchange resin typically is charged at or near maximum levels and possesses a high binding affinity for ions. Traditionally, this excessive binding affinity quickly removed a large number of ions from the juice being deacidified, making the juice too basic, and creating an environment prime for microbial growth and loss of juice quality. In keeping with the invention it is desirous to condition the regenerated ion exchange resin before using same in the deacidification of citrus juice.

This invention provides a manner of conditioning, or "preconditioning," exchange resin following regeneration. This conditioning decreases the binding affinity of the resin to a controlled degree, allowing the resin to adsorb the desired amount of acidic ions of the juice without greatly altering the deacidified juice from its desired pH. In keeping with the invention, the resin is conditioned when contacted with a food-grade acid aqueous composition. Such compositions can contain citric acid, malic acid, ascorbic acid, or a combination of food-grade acids. The preferred composition is an aqueous citric acid composition. Some acids may be less economically attractive than the preferred acid for use as the conditioning composition.

A typical concentration of an acid such as citric acid in this aqueous conditioning composition is at least about 0.2 weight percent, typically no more than about 3 weight percent, based upon the total weight of the conditioning composition. Preferably, the food grade acid concentration is between about 0.5 and about 2 weight percent. Most preferably, the acid is present in the preconditioning composition at a level between about 0.7 and about 1.5 weight percent based upon the total weight of the preconditioning composition.

Referring further to the food grade acid concentrations within the preconditioning composition, a 2.5 weight percent composition contains 100 grams of acid per 4 liters (approximately 4000 grams) of the aqueous composition. A 0.25 weight percent composition contains 10 grams of acid per 4 liters of composition. A 1 weight percent composition contains 40 grams of acid per 4 liters of preconditioning composition.

By conditioning the ion exchange resin with a controlled concentration of acid, the binding affinity is decreased, and the resin is primed to remove the desired amount of acidity from the citrus juice by avoiding removal of so many acidic ions that the pH is raised to as high as about 4.6 or above. Preferably, the pH does not exceed 4.5. At times, especially in order to provide a measure of added safety in commercial-scale production, it is desired to maintain the juice pH at or below 4.4 or as low as not greater than about 4.3. Under otherwise suitable conditions, it is possible to tolerate having the pH of the treated juice be above these levels for only the initial couple of bed volumes. For example, the pH of the juice treated by the first one or two bed volumes can be slightly in excess of 4.5.

In the conditioning process, however, care must be taken to avoid "over-conditioning" the resin. The overall efficiency of a resin could be reduced by over-conditioning. For a conditioning composition such as a citric acid aqueous composition discussed herein, the citric acid molecules should occupy not more than about 30 percent of the available resin sites, preferably not more than about 20 percent of the sites.

A typical resin system has a capacity which absorbs between about 150 and 180 grams of citric acid per liter of resin. The preconditioning should pass not more than about 80 grams of citric acid in the conditioning composition per liter of resin. Typically, between about 10 grams and about 50 grams of citric acid per liter of resin will be used. In the preferred embodiment, between about 20 grams and about 40 grams of composition per liter of resin are used. By conditioning the ion exchange resin with less than 80 grams of citric acid in the conditioning composition per liter of resin, the resin may be primed to remove the desired amount of acidic ions without fear of over-conditioning the resin.

An example of parameters which will effectively precondition the fresh or regenerated resin system without over-conditioning so as to reduce the economic advantages of the invention are as follows. For a preconditioning composition having a 1 weight percent concentration of food grade acid such as citric acid, that preconditioning composition should pass through at least about 3 bed volumes of the resin system to achieve the pH reduction and acidity increase of the invention. Generally, the number of bed volume "turn overs" required will be higher the slower the flow rate through the resin system. The number of bed volume "turn overs" required also will vary with the specific resin system in use. Generally, less total bed volume pretreatment is required for resin systems having relatively low levels of strong adsorption sites. A typical low level of strong sites is about 10 volume percent.

Following conditioning, the ion exchange resin may be used in deacidification again. The entire deacidification process may be continuous or may be done in intervals. The result of deacidification with the step of conditioning the regenerated ion exchange resin is a citrus juice that is deacidified without having any portion of the citrus juice experience a pH spike or rise above that characteristic of a so-called acid food juice. A typical acid food orange juice will have a pH of not greater than about 4.5. Citrus juice which is deacidified without this conditioning procedure typically passes well above this acid food range for a portion of the juice flow. Juice which is not consistently at the acid food level does not totally safeguard against microbial growth and possible resulting juice deterioration.

In another aspect or embodiment of the invention, the rate of flow of the juice being deacidified can be chosen and/or varied to gain an advantage. The rate of juice flow through the resin in general influences the ability of the resin to adsorb the ions and reduce acidity of the juice. When the flow rate is faster, there is less contact time between the juice and the resin, and thus less time for the acidity of the juice to be reduced. In accordance with this aspect of the invention, the juice pH is maintained at the low levels according to the invention even during the early bed volumes by processing these early bed volumes at a relatively rapid rate of juice flow.

More specifically, a typical commercial citrus juice deacidification system runs at a rate of about 5 bed volumes per hour. In accordance with this aspect of the invention, the initial bed volumes of juice will be run at a much faster rate, such as at least about 15 bed volumes per hour, often at least about 20 bed volumes per hour. Much faster rates are possible, which brings with a reduced efficiency of adsorption as the speed at which the juice flows past the resin increases. Accordingly, the juice flow during the early bed volumes will be at a rate which is at least about twice the generally accepted normal flow rate of about 5 bed volumes per hour, preferably at least about 3 times this normal juice flow rate, most preferably at least about 4 times this normal juice flow rate. It is contemplated that this early bed volume increased rate of flow is combined with the preconditioning aspect of the invention, although the increased early flow rate alone has benefits in achieving advantages of the invention.

Referring now to the duration of the early rapid flow rate, this is affected by the extent of any resin preconditioning. Generally, the greater the extent of preconditioning the fewer the number of more rapid bed volumes (and the slower the speed which is needed). Typically, the early rapid flow rate will continue for at least one to two bed volumes up to about 8 or more bed volumes.

It is usually desireable to step down the flow rate to an intermediate speed during the next or intermediate bed volumes of juice deacidification. Typically any intermediate flow rate will be at least about 7 bed volumes per hour, preferably at least about 9 bed volumes per hour. This intermediate flow rate is at least about 1.5 times the normal juice flow rate, typically at least about 2 times the normal juice flow rate. More than one intermediate flow rate level can be chosen as needed. The duration of each intermediate rate level, when practiced, will continue for at least one or two bed volumes, up to about 8 or more bed volumes. Thereafter, the rate can level off to the normal orange juice deacidification rate of at least about 4 bed volumes per hour, typically not more than about 8 bed volumes per hour.

Ultimately, if multiple intermediate rate levels are chosen, the rate reduction can be considered to be continuous. When each intermediate rate level persists for a full bed volume, the number of rate levels can coincide with the number of bed volumes during the deacidification run. The main requirement for this embodiment is that the rate begins at a level in excess of the normal rate level for that deacidification system and has at least one step down in rate during the deacidification run.

EXAMPLE 1

A resin bed column of Dowex® 77 was regenerated with 2% sodium hydroxide during a bed turn over of 3 plus column volumes. The regenerated resin was subjected to pretreatment with 1% by weight of citric acid through a fast flow bed turn over of 4 bed volumes. One bed volume in this Example was 500 ml. Thus 4 bed volumes or 2000 ml were run through the resin. This preconditioning composition contained 20 grams of citric acid per 2 liters of composition. This was applied to the resin at the volume rate of 4 liters of composition per liter of resin, i.e., the treatment volume of 4 bed volumes preconditioned the resin bed volume adequately to achieve the pH and acidity levels of the invention for the bed volumes run initially after pretreatment and thereafter.

Orange juice was centrifuged to remove suspended solids to minimize resin clogging during deacidification. The separated suspended solids were recombined as desired after deacidification of the juice which was thus reduced in suspended solids. The flow rate of this orange juice through these bed volumes varied, initially at 21.6 bed volumes per hour (180 ml per minute), then at 9.6 bed volumes per hour (80 ml per minute) for bed volumes 7 through 14, and then at 6 bed volumes per hour (50 ml per minute) for bed volumes 15 through 20. This is illustrated in FIG. 1.

The test orange juice from the freshly regenerated resin (before it had been fully preconditioned with citric acid) had a pH of about 4.7 and a titratable acidity of about 0.2 percent. Thereafter, the pH range of the juice run was 4.5. to 3.9, showing good pH control. The capacity also was good; namely, 62 percent of the acid was removed at 20 bed volume composite sample. Duplicate runs were conducted. See FIG. 1. In one run (No. 1), after the first bed volume, the orange juice was maintained at a pH of 4.5 or less throughout the bed volumes of the run, with the titratable acidity being between about 0.45 and about 0.31 percent. In the other run (No. 2), after the initial bed volume, the orange juice was maintained at a pH of 4.5 or less throughout the run, with the titratable acidity being between about 0.45 and about 0.35 percent. FIG. 1 shows the initial low acidity and beneficial acidity increase and pH decrease achieved by the preconditioning approach. The composite acidity for runs 1 through 10 was 0.36 percent acid and, for runs 1 through 20 it was 0.35 percent acid. For a preferred orange juice product, this deacidified juice is blended with non-deacidified juice to prepare a product having an acidity on the order of about 0.55 to about 0.8 percent acid.

EXAMPLE 2

Figure 2:
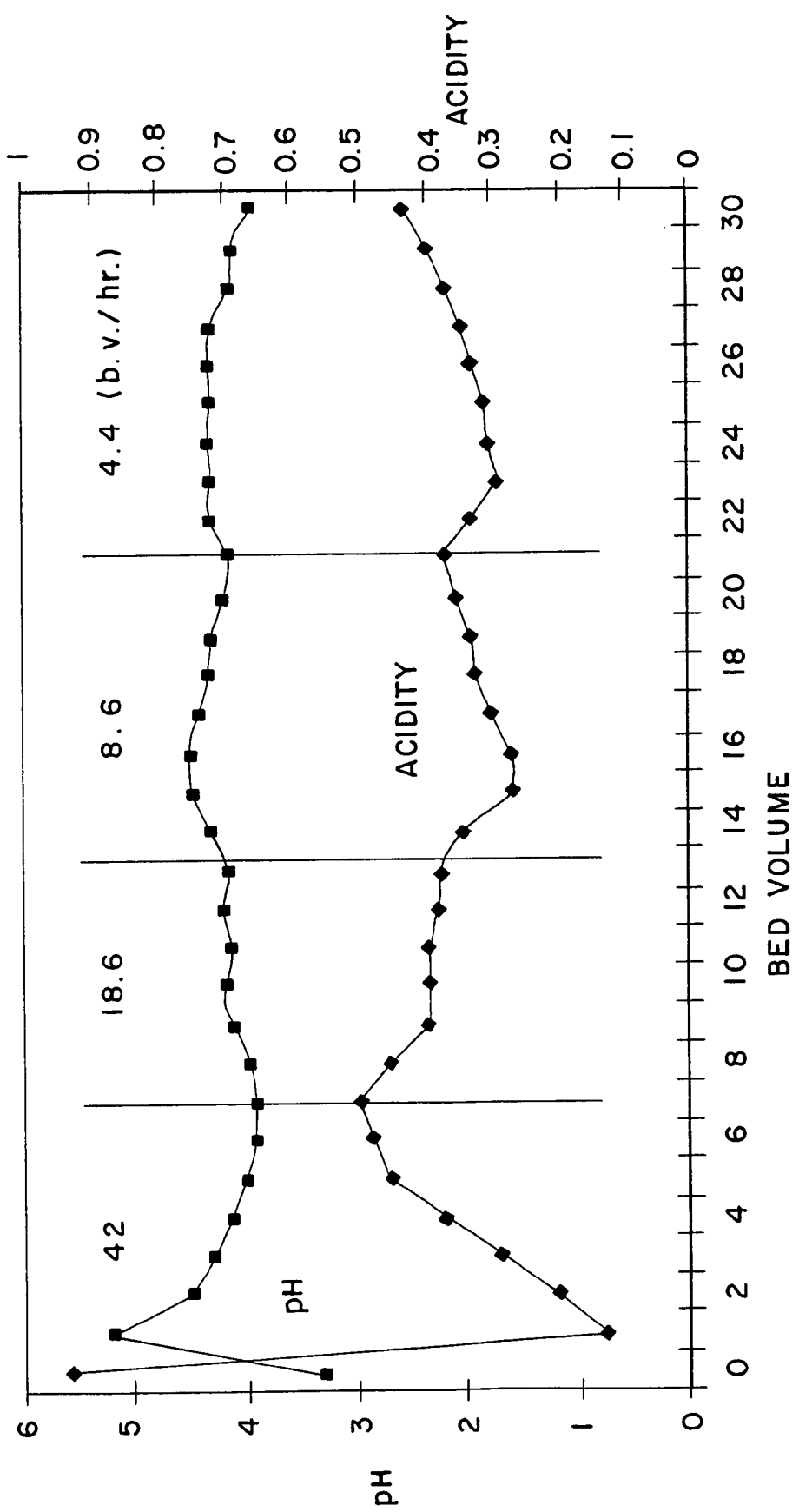
FIG. 2 is a plot similar to that of FIG. 1 for a different system.

A resin bed of Dowex® 77 was regenerated with 2% sodium hydroxide during a bed turn over of 3 bed volumes of 500 ml each. Orange juice (after centrifiguration to reduce suspended solids content) was passed through the regenerated column with a varying juice flow rate characterized as fast, moderate and slow. Results are shown in FIG. 2. The rate started at 42 bed volumes per hour, stepping down to 4.4 bed volumes per hour. The composite of bed volumes 1 through 10 was 0.38 percent acid, the composite of bed volumes 1 through 20 was 0.35 percent acid, and the composite of bed volumes 1 through 30 was 0.35 percent acid. After the first bed volume, the pH range was 4.7 to 4.1, showing good pH control, and the capacity was good, 68 percent acid removal at 20 bed volume composite juice sample.

EXAMPLE 3

Three different resin beds were regenerated with 2% sodium hydroxide during a bed turn over of 3 bed volumes of 500 ml each. The resins were Amberlite® IRA-68, Duolite® A7 and Dowex® 77. Some of the regenerated Amberlite® IRA-68 was used directly to deacidify pre-centrifuged orange juice. Otherwise, the three regenerated resins were subjected to fast flow passage of 1% citric acid therethrough for four bed volumes. Orange juice, which had been centrifuged to reduce suspended solids, was passed through all four resin volumes at varying juice flow rates. Through bed volume 7 the flow rate was 25.2 bed volumes per hour. For bed volumes 8 through 14, the flow rate was 12 bed volumes per hour, and for bed volumes 15 through 20, the flow rate was 6.2 bed volumes per hour.

Figure 3:
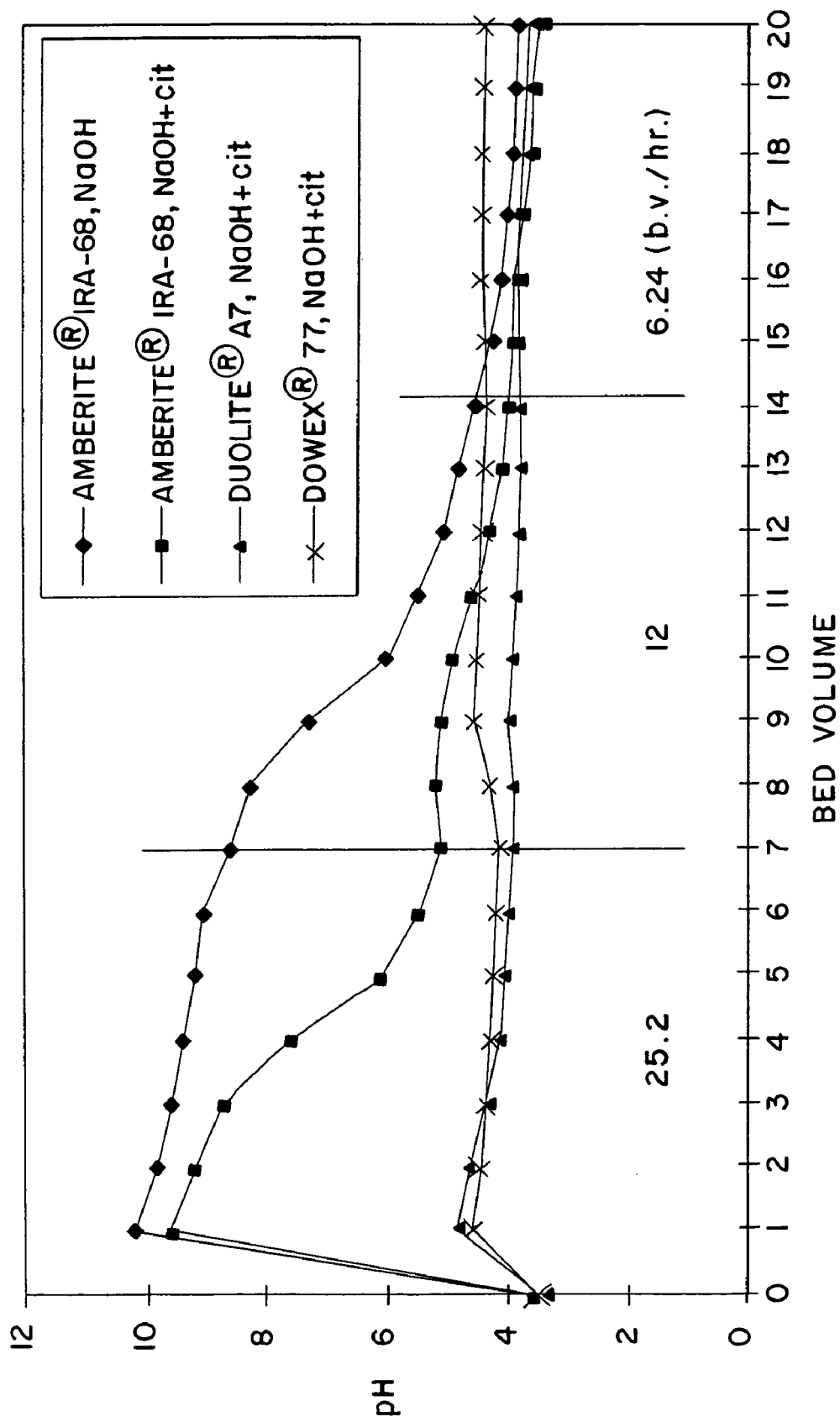
FIG. 3 is a plot of juice pH at different bed volumes for a plurality of resins.

Plots of pH versus bed volume number are given in FIG. 3. The Duolite® and Dowex® resins gave good pH control, with the Duolite® resin showing a range of 4.8 pH to 3.6 pH, and the Dowex® resin showing a range of 4.5 pH to 4.1 pH. The capacity of the Dowex® resin was noticeably better than that of the Duolite® resin, the former being 62% acid removed at 20 bed volumes composite sample while the latter had a 44% capacity. While the capacity of the Amberlite® resin was good, 65%, its early pH control was not adequate, from 9.6 pH to 3.5 pH; however, this pH control was improved over that of the same resin which had not been preconditioned.

It will be understood that the embodiments of the present invention which have been described are illustrative of some of the principles and applications of the present invention. Numerous modifications may be made by those skilled in the art without departing from the true spirit and scope of the invention.

The invention claimed is:

1. A process for deacidifying a citrus juice stream with ion exchange resin, comprising:
 (a) providing an ion exchange resin, said resin either being theretofore unused or having been regenerated with a basic composition thereby removing anions from the resin and reestablishing a fresh binding affinity of the resin for acidic ions;
 (b) conditioning the resin by contacting the resin with an aqueous food-grade acid preconditioning composition, thereby decreasing the binding affinity of the resin for acidic ions and providing preconditioned ion exchange resin; and
 (c) flowing citrus juice through said pre-conditioned ion exchange resin to provide a deacidified flow of citrus juice while avoiding raising the pH of the juice to above that of an acid food pH for said citrus juice.

2. The process in accordance with claim 1, wherein said ion exchange resin is a weakly-basic anionic exchange resin.

3. The process in accordance with claim 1, wherein said flowing in (c) continues until the ion exchange resin is substantially spent, after which same is regenerated and again preconditioned as in (b).

4. The process in accordance with claim 1, further including using the deacidified flow of citrus juice as a not-from-concentrate juice.

5. The process in accordance with claim 1, wherein said aqueous food-grade acid composition of (b) is selected from the group consisting of citric acid, malic acid, ascorbic acid and blends thereof.

6. The process in accordance with claim 1, wherein said food-grade acid is present in the amount of between about 10 and about 80 grams of acid in the preconditioning composition per liter of resin.

7. The process in accordance with claim 1, wherein said food-grade acid is present in the preconditioning composition in an amount of not less than about 0.2 weight percent and not greater than about 3 weight percent, based upon the total weight of the preconditioning composition.

8. The process in accordance with claim 1, wherein said food-grade acid is present in the preconditioning composition in an amount of not less than about 0.5 and not greater than about 2 weight percent, based upon the total weight of the preconditioning composition.

9. The process in accordance with claim 1, wherein said citrus juice of (c) is a single strength juice meeting SOI criteria therefor.

10. The process in accordance with claim 1, further including washing the regenerated resin of (a) with an aqueous composition in order to remove excess basic composition prior to said conditioning of (b).

11. The process in accordance with claim 1, wherein said flowing of (c) avoids raising the pH to 4.6 or above.

12. The process in accordance with claim 1, wherein said flowing of (c) avoids raising the pH to 4.5 or above during said flowing except for during up to about an initial two bed volumes of said flowing.

13. The process in accordance with claim 1, wherein said flowing of (c) avoids raising the pH to 4.4 or above.

14. The process in accordance with claim 1, wherein said flowing of (c) avoids raising the pH to 4.3 or above.

15. The process in accordance with claim 1, wherein said conditioning of (b) contacts the resin with an aqueous citric acid composition, and said flowing of (c) deacidifies a flow of orange juice while avoiding raising the pH of the juice to 4.6 or above so as to control microbial growth in the juice.

16. The process in accordance with claim 1, wherein said flowing of (c) proceeds at a flow rate during an early bed volume which is faster than that of a later bed volume.

17. The process in accordance with claim 16, wherein said early bed volume flow rate is at least twice as fast as said later bed volume flow rate.

18. The process in accordance with claim 17, wherein said early bed volume flow rate is at least about 20 bed volumes per hour, and said later bed volume flow rate is not greater than about 6 volumes per hour.

19. The process in accordance with claim 16, wherein said early bed volume juice flow rate is at least three times as fast as said later bed volume juice flow rate.

20. The process in accordance with claim 19, wherein said later bed volume is between about 3 and about 7 bed volumes of juice per hour.

21. The process in accordance with claim 16, wherein said early bed volume flow rate is about four times faster than said later bed volume juice flow rate, which is between about 4 and about 6 bed volumes of juice per hour.

22. A process for deacidifying a citrus juice stream with ion exchange resin, comprising:
 (a) providing an ion exchange resin, said resin either being theretofore unused or having been regenerated with a basic solution thereby removing anions from the resin and reestablishing a fresh binding affinity of the resin for acidic ions to provide a regenerated ion exchange resin;

(b) flowing citrus juice through said regenerated ion exchange resin through a plurality of bed volumes including an early bed volume and a later bed volume; and (c) said early bed volume flow rate is at least three times as fast as said later bed volume flow rate to provide a deacidified flow of citrus juice while avoiding raising the pH of the juice to above that of an acid food pH for said citrus juice.

23. The process in accordance with claim 22, wherein said ion exchange resin is a weakly-basic anionic exchange resin, and said flowing in (b) continues until the ion exchange resin is substantially spent, after which same is regenerated again.

24. The process in accordance with claim 22, further including using the deacidified flow of citrus juice as a not-from-concentrate juice.

25. The process in accordance with claim 22, wherein said citrus juice of (c) is a single strength juice meeting SOI criteria therefor.

26. The process in accordance with claim 22, wherein said flowing of (c) avoids raising the pH to 4.6 or above.

27. The process in accordance with claim 22, wherein said flowing of (c) avoids raising the pH to 4.5 or above during said flowing except for during up to about an initial two bed volumes of said flowing.

28. The process in accordance with claim 22, wherein said early bed volume juice flow rate is at least four times as fast as said later bed volume juice flow rate.

29. The process in accordance with claim 28, wherein said later bed volume twice flow rate is between about 3 and about 7 bed volumes of juice per hour.

30. The process in accordance with claim 22, wherein said early bed volume flow rate is at least about four times faster than said later bed volume juice flow rate, which is between about 4 and about 6 bed volumes of juice per hour.

* * * * *